(12) United States Patent
Handshaw et al.

(10) Patent No.: US 11,960,963 B2
(45) Date of Patent: Apr. 16, 2024

(54) BARCODE READERS WITH BIOMETRIC USER IDENTIFICATION

(71) Applicant: ZEBRA TECHNOLOGIES CORPORATION, Lincolnshire, IL (US)

(72) Inventors: Darran Michael Handshaw, Sound Beach, NY (US); Stefanie Handshaw, Sound Beach, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 89 days.

(21) Appl. No.: 17/877,349

(22) Filed: Jul. 29, 2022

(65) Prior Publication Data

US 2024/0037357 A1 Feb. 1, 2024

(51) Int. Cl.
*G06K 7/10* (2006.01)
*G06F 21/32* (2013.01)

(52) U.S. Cl.
CPC ........... *G06K 7/1096* (2013.01); *G06F 21/32* (2013.01); *G06K 7/10732* (2013.01)

(58) Field of Classification Search
CPC .............................. G06K 7/1096; G06F 21/32
USPC ........................................................ 235/440
See application file for complete search history.

(56) References Cited

U.S. PATENT DOCUMENTS

2020/0349538 A1* 11/2020 Glaser .............. G06K 19/07701

* cited by examiner

*Primary Examiner* — Toan C Ly
(74) *Attorney, Agent, or Firm* — Yuri Astvatsaturov (57) ABSTRACT

An example barcode reader includes a housing having a window. An imaging assembly is recessed within the housing, has an imaging field-of-view (FOV) directed toward the window, and includes an imager configured to capture an image of an object positioned within a product scanning region. An illumination assembly is recessed within the housing and has an illumination FOV directed toward the window and overlaps the imaging FOV by at least 70% from zero to 3 inches from the window. A controller is configured to receive a captured image from the imaging assembly and to process the captured image to: determine if the object is a product for sale or a hand of a user; decode a barcode if the object is a product for sale; and identify elements of the hand of the user for identification if the object is the hand of the user.

29 Claims, 8 Drawing Sheets

BARCODE READERS WITH BIOMETRIC USER IDENTIFICATION

BACKGROUND

Typical barcode readers can and are used to identify products for sale and to capture and decode barcodes that can be located on products for sale, identifications, wristbands, etc. However, there has been an increased use of biometrics for user identification for use with payment and other security functions. It would be beneficial if a barcode scanner could be used not only to capture and decode barcodes, but could also be used to identify the user of the barcode reader based on biometric data.

SUMMARY

In an embodiment, the present invention is a bioptic barcode reader comprising a housing having a lower housing portion with an upper surface facing a product scanning region and an upper housing portion extending above the lower housing portion. A generally horizontal window is positioned at the upper surface of the lower housing portion and a generally upright window is positioned in the upper housing portion. An imaging assembly is recessed within the lower housing portion and has an imaging field-of-view (FOV) that is directed toward the horizontal window and an imager configured to capture an image of an object positioned within the product scanning region. An illumination assembly is recessed within the lower housing portion and has an illumination FOV that is directed toward the horizontal window and overlaps the imaging FOV by at least 70% within the product scanning region from zero inches to 3 inches above the horizontal window. A controller is in communication with the imaging assembly and the illumination assembly and is configured to receive a captured image from the imaging assembly and to process the captured image to: determine if the object is a product for sale or a hand of a user; decode a barcode located on the object if the object is a product for sale; and identify elements of the hand of the user for identification of the user if the object is the hand of the user.

In a variation of this embodiment, the illumination assembly includes an illumination source that produces visible light and the controller is configured to process the captured image to identify the user by identifying anthropometric and/or palm print elements of the hand of the user.

In another variation of this embodiment, the illumination assembly includes an illumination source that produces infrared light and the controller is configured to process the captured image to identify the user by identifying palm vein arrangements of the hand of the user.

In another variation of this embodiment, the illumination assembly includes a first illumination source that produces infrared light and a second illumination source that produces visible light and the controller is configured to process the captured image to identify the user through one or more of: identifying palm vein arrangements of the hand of the user, identifying palm print elements of the hand of the user, and/or identifying anthropometric measurements of the hand of the user.

In another embodiment, the present invention is a barcode reader comprising a housing having a surface facing a product scanning region and a window positioned at the surface of the housing. An imaging assembly is recessed within the housing and has an imaging FOV that is directed toward the window and includes an imager configured to capture an image of an object positioned within the product scanning region. An illumination assembly is recessed within the housing and has an illumination FOV that is directed toward the window and overlaps the imaging FOV by at least 70% within the product scanning region from zero inches to 3 inches from the window. A controller is in communication with the imaging assembly and the illumination assembly and is configured to receive a captured image from the imaging assembly and to process the captured image to: determine if the object is a product for sale or a hand of a user; decode a barcode located on the object if the object is a product for sale; and identify elements of the hand of the user for identification of the user if the object is the hand of the user.

In a variation of this embodiment, the illumination assembly includes an illumination source that produces visible light and the controller is configured to process the captured image to identify the user by identifying anthropometric and/or palm print elements of the hand of the user.

In another variation of this embodiment, the illumination assembly includes an illumination source that produces infrared light and the controller is configured to process the captured image to identify the user by identifying palm vein arrangements of the hand of the user.

In another variation of this embodiment, the illumination assembly includes a first illumination source that produces infrared light and a second illumination source that produces visible light and the controller is configured to process the captured image to identify the user through one or more of: identifying palm vein arrangements of the hand of the user, identifying palm print elements of the hand of the user, and/or identifying anthropometric measurements of the hand of the user.

In another embodiment, the present invention is a barcode reader comprising a housing having a surface facing a product scanning region and a window positioned at the surface of the housing. An imaging assembly is recessed within the housing and has an imaging FOV that is directed toward the window and includes an imager configured to capture an image of an object positioned within the product scanning region. An illumination assembly is recessed within the housing and has an illumination FOV that is directed toward the window. A camera is recessed within the housing and has a camera FOV that is directed toward the window, where the illumination FOV overlapping the camera FOV by at least 70% within the product scanning region from zero inches to 3 inches from the window. A controller is in communication with the imaging assembly, the illumination assembly, and the camera, and is configured to receive a first captured image from the imaging assembly, receive a second captured image from the camera, process the first captured image to decode a barcode if the object is a product for sale, and process the second captured image to identify elements of a hand of a user if the object is the hand of the user.

In a variation of this embodiment, the illumination assembly includes an illumination source that produces visible light and the controller is configured to process the captured image to identify the user by identifying anthropometric and/or palm print elements of the hand of the user.

In another variation of this embodiment, the illumination assembly includes an illumination source that produces infrared light and the controller is configured to process the captured image to identify the user by identifying palm vein arrangements of the hand of the user.

In another variation of this embodiment, the illumination assembly includes a first illumination source that produces infrared light and a second illumination source that produces visible light and the controller is configured to process the captured image to identify the user through one or more of: identifying palm vein arrangements of the hand of the user, identifying palm print elements of the hand of the user, and/or identifying anthropometric measurements of the hand of the user.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The example barcode readers disclosed herein, in addition to being used to decode barcodes on products, can also be used to capture an image of the hand of a user and identify elements of the hand of the user to provide identification of the user. This user identification can be used for a variety of purposes, such as: verifying an age of the user (i.e., for the purchase of alcohol, tobacco, etc.), associating the user with a loyalty account, confirming a medical identification of the user, logging into a point-of-sale system (i.e., a cashier logging in to a particular register), comparing the identity of the user to a second form of identification (i.e., a barcode on a medical identification bracelet, a photo or barcode on a driver's license, etc.), etc.

Figure 1:
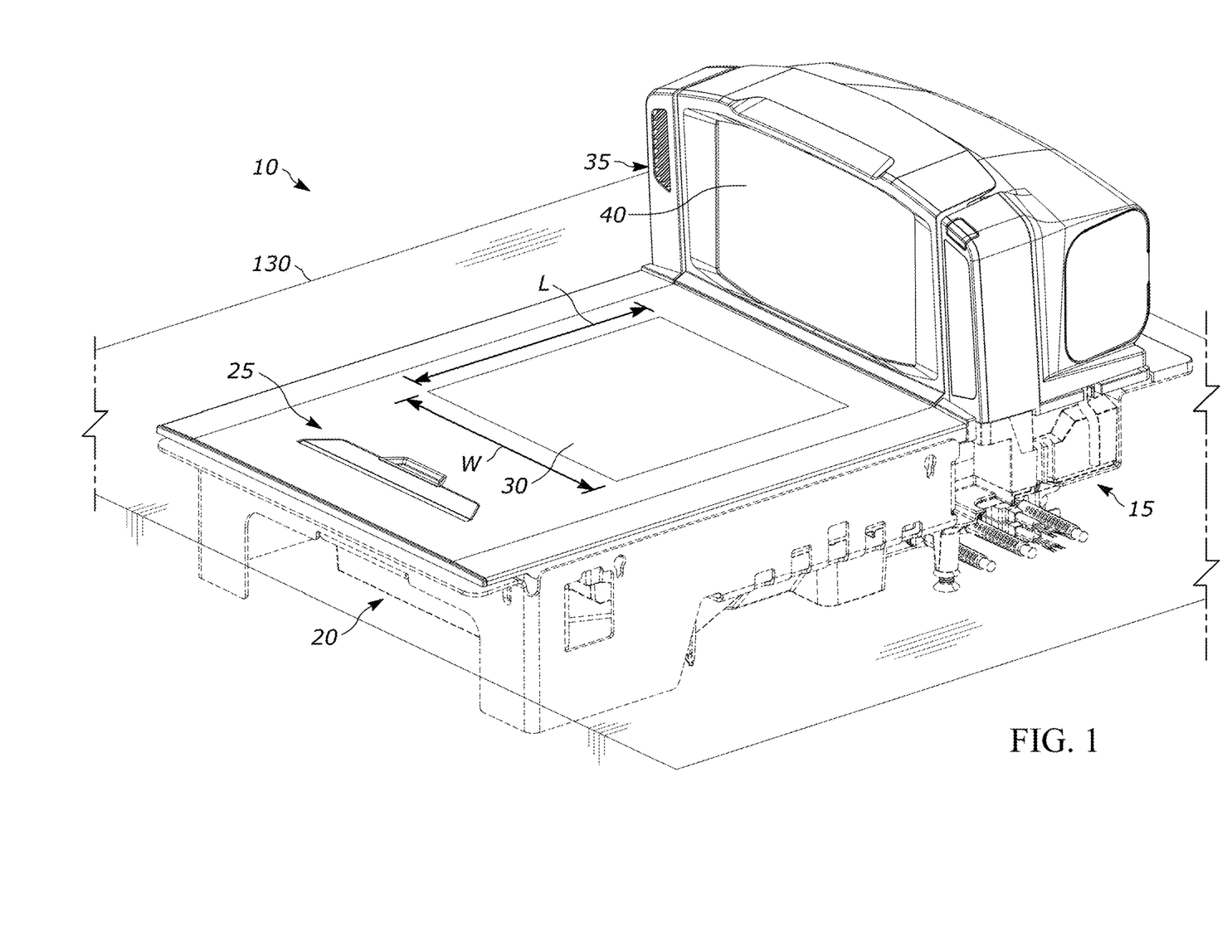
FIG. 1 illustrates a front perspective view of an example bioptic barcode reader.
Figure 2:
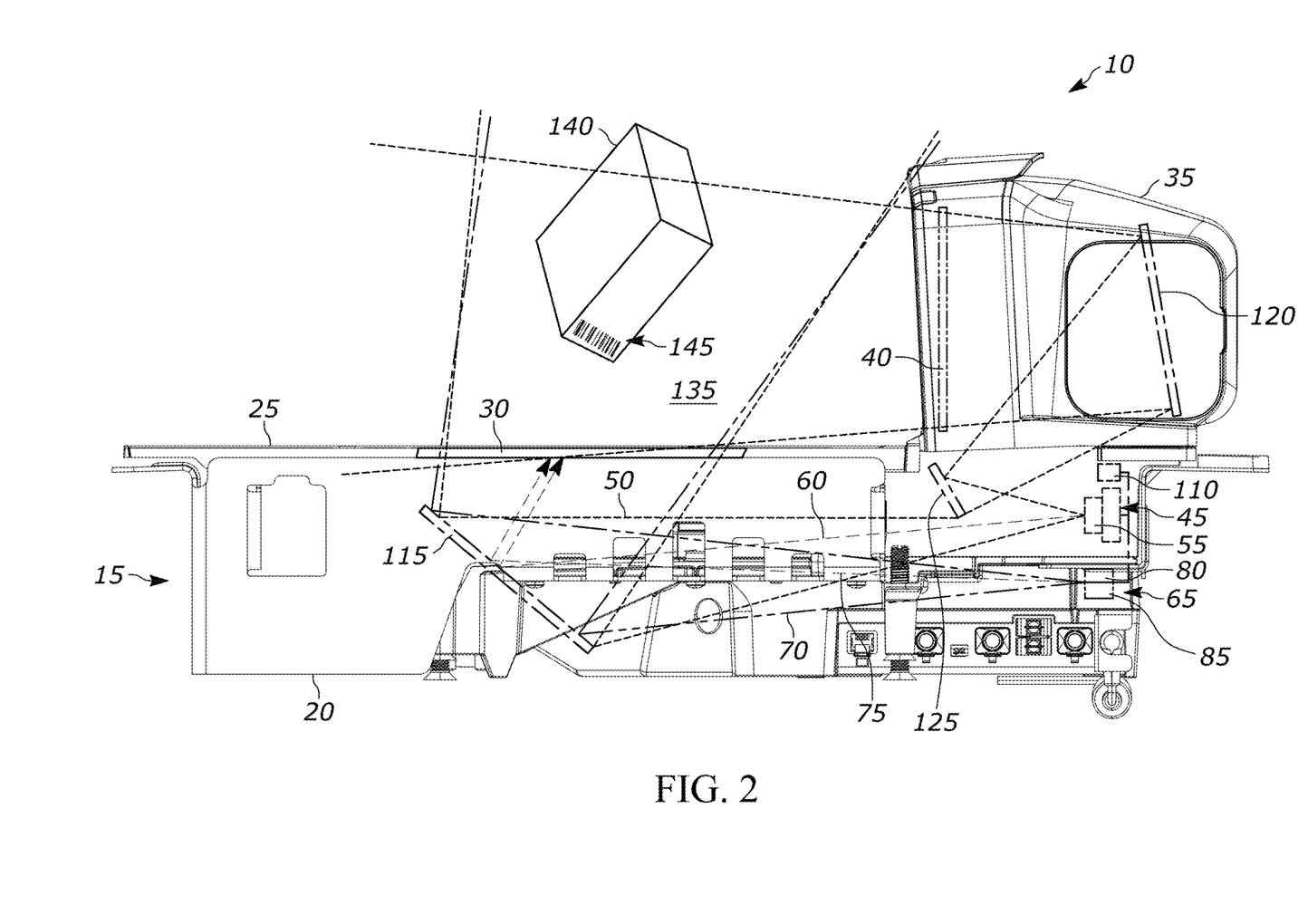
FIG. 2 illustrates a side view of the bioptic barcode reader of FIG. 1 with a product in the product scanning region.
Figure 3:
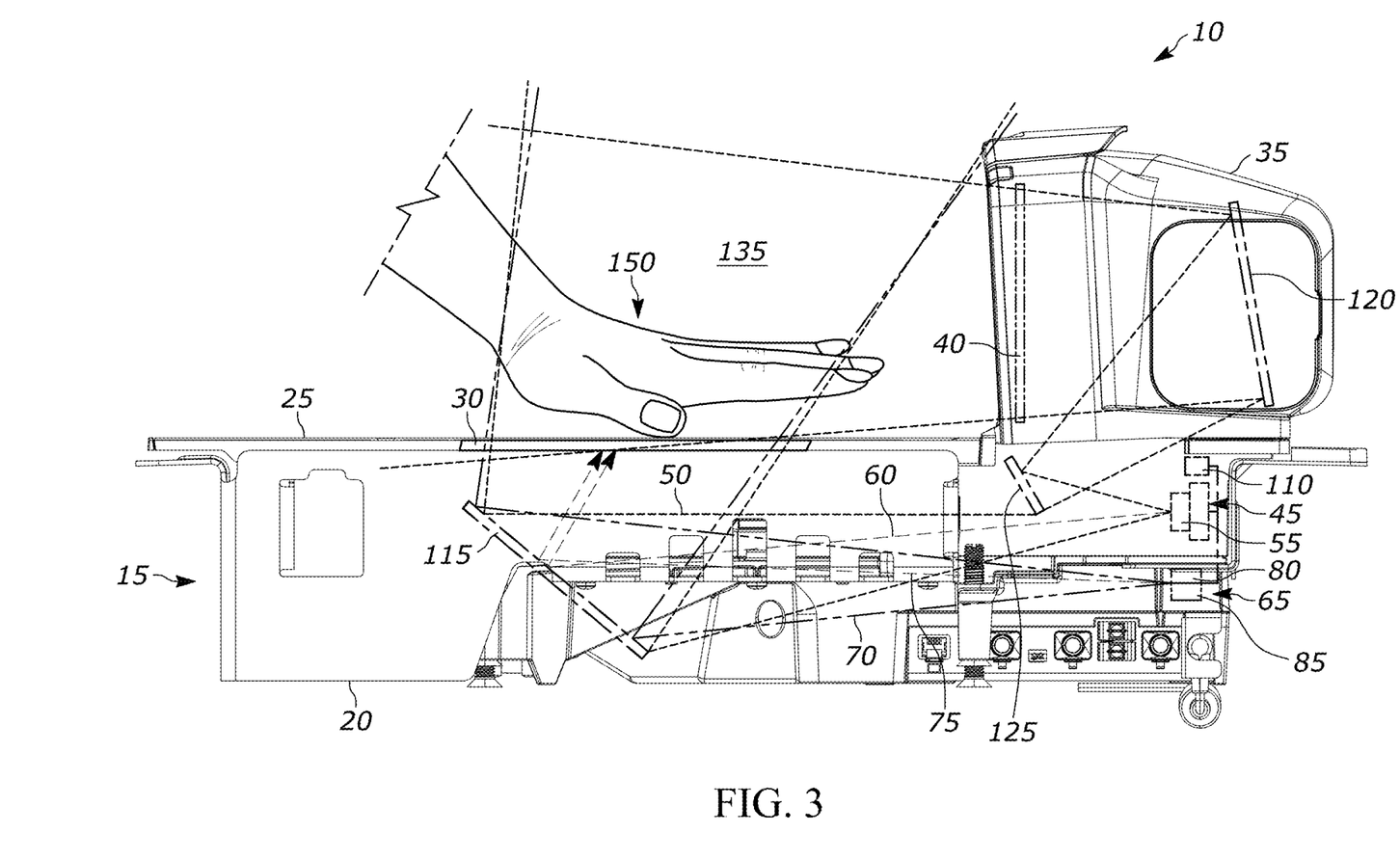
FIG. 3 illustrates a side view of the bioptic barcode reader of FIG. 1 with a hand of a user in the product scanning region.

Referring to FIGS. 1-3, an example bioptic barcode reader 10, such as the Zebra® MP7200 bioptic barcode reader, is shown and can be configured to be supported by a workstation 130, such as a checkout counter at a POS of a retail store. In the example shown, bioptic barcode reader 10 has a housing 15 that includes a lower housing portion 20 and an upper housing portion 35 that extends above lower housing portion 20. A generally horizontal window 30 is positioned at an upper surface 25 of lower housing portion 20, which faces a product scanning region 135, to allow a set of optical components positioned within housing 15 to direct at least one field-of-view through horizontal window 30. A width W of horizontal window 30 and a length L of horizontal window 30 are each equal to or greater than 3 inches and, preferably, both width W and length L are equal to or greater than 4 inches, which typically should be sufficient to capture the entire palm of the user to make identification more accurate. Upper housing portion 35 includes a generally upright window 40 to allow a set of optical components positioned within housing 15 to direct at least one FOV through upright window 40. The fields-of-view directed through horizontal window 30 and upright window 40 intersect to define product scanning region 135, where an object can be scanned for sale at the POS or an image of a hand of a user 150 can be captured.

As shown in FIG. 2-3, an example optical assembly of bioptic barcode reader 10 can generally include an imaging assembly 45 and an illumination assembly 65. Imaging assembly 45 is positioned within housing 15, is recessed within lower housing portion 20 such that an internal path length 60 between a front of imaging assembly 45 and horizontal window 30 is at least 2 inches and, preferably, is at least 4 inches, and has an imaging field-of-view (FOV) 50 that is directed toward horizontal window 30 and, preferably, fills most of horizontal window 30. As used herein, the front of imaging assembly 45 could be the front surface of an imager, the front surface of a lens, the front surface of a baffle, the front surface of a lens holder, etc., depending on the structure of the particular imaging assembly used. Imaging assembly 45 includes an imager 55, such as a CMOS digital image sensor, that can be configured to capture an image of an object, such as a product 140 being purchased or a hand of a user 150, that is positioned within product scanning region 135. Illumination assembly 65 is also positioned within housing 15, is recessed within lower housing portion 20 such that an internal path length 75 between a front of illumination assembly 65 and horizontal window 30 is at least 1.2 inches to provide sufficient illumination uniformity, and has an illumination FOV 70 that is directed toward horizontal window 30. Recessing imaging assembly 45 and illumination assembly 65 within lower housing portion 20 and spaced from horizontal window 30, rather than positioning imaging assembly 45 or illumination assembly 65 at or near horizontal window 30, provides longer internal path lengths 60, 75 and more coverage and even illumination of imaging FOV 50 by illumination FOV 70, which allows imaging assembly 45 to view objects, such as the hand of a user 150, up close to horizontal window 30 and at greater range of distances from horizontal window 30. For example, illumination FOV 70 preferably overlaps imaging FOV 50 by at least 70% within product scanning region 135 at distances from 0 inches to 3 inches above horizontal window 30 and imaging assembly 45 should be configured to have a depth of focus that includes distances from 0 inches to 3 inches above horizontal window 30. Conversely, typical biometric identification systems do not have recessed optics and often position the illumination source at or near the window, which requires the user to position their hand a predetermined distance away from the window, which then requires additional systems to be added to indicate to a user the correct position and distance for the user to place their palm in order to ensure a good read.

In the particular example shown in FIGS. 1-3, the optical assembly also includes a first mirror 115, a second mirror 120, and a splitter mirror 125 that redirects a portion of imaging FOV 50 of imaging assembly towards second mirror 120. Splitter mirror 125 is positioned within housing 15 and is positioned and oriented to redirect a portion of imaging FOV 50 toward second mirror 120, which is positioned in upper housing portion 35 of housing 15 and redirects the portion of imaging FOV 50 redirected by splitter mirror 125 toward upright window 40. The portion of imaging FOV 50 not redirected by splitter mirror 125 is directed towards first mirror 115, which is positioned within lower housing portion 20 of housing 15 and redirects the portion of imaging FOV 50 not redirected by splitter mirror 125 toward horizontal window 30. Illumination FOV 70 of illumination assembly 65 is also directed towards first mirror 115, which also redirects illumination FOV 70 towards horizontal window 30. Alternatively, bioptic barcode reader could also have various other optical assemblies as well. For example, rather than splitter mirror 125 being a planar mirror and bioptic barcode reader 10 having only second mirror 120 in upper housing portion 35, splitter mirror 125 can be a concave or convex splitter mirror that also splits a portion of imaging FOV 50 into two additional portions, directs one of the additional portions toward second mirror 120 and the other additional portion toward a third mirror in upper housing portion, which would provide two fields-of-view through upright window 40. In another example, bioptic barcode reader 10 could have two imaging assemblies, or an imaging assembly with two imagers, where the entire FOV of one imaging assembly (imager) is directed toward first mirror 115 and the entire FOV of the other imaging assembly (imager) is directed toward splitter mirror 125. Similarly, splitter mirror could be removed and the other imaging assembly (imager) could be directed at second mirror 120. In yet another example, bioptic barcode reader 10 could have two imaging assemblies, or an imaging assembly with two imagers, with one imaging assembly (imager) directed directly at horizontal window 30 and the other imaging assembly (imager) directed directly at upright window 40, without any required mirrors.

A controller 110, which can include a processor and a memory, is positioned within housing 15 and is in communication with imaging assembly 45 and illumination assembly 45 via any appropriate means, such as a wired or wireless connection. Controller 110 is configured to receive a captured image from imaging assembly 45 and to process the captured image and determine if an object is present in the captured image and, if so, if the object is a product 140 for sale or a hand of user 150. Controller 110 could be configured to either recognize the presence of a hand of a user 150 and then capture an image or could provide an instruction through bioptic barcode reader 10 or through another host system to instruct the user when to place their hand in the product scanning region 135 and capture the image once controller 110 has detected the hand of the user 150 in the product scanning region 135. If controller 110 determines that the object is a product 140, controller 110 can be configured to locate and decode a barcode 145 located on product 140. If controller 110 determines that the object is a hand of a user 150, controller 110 can be configured to identify elements of the hand of the user 150, for example, for identification of the user. Alternatively, rather than controller 110 processing and identifying elements of the hand of the user 150, controller 110 could be configured to transmit the image to a processor external to bioptic barcode reader 10 to identify the elements of the hand of the user 150, which would then communicate back to controller 110 the identity of the user based on the processing by the external processor.

Figure 8:
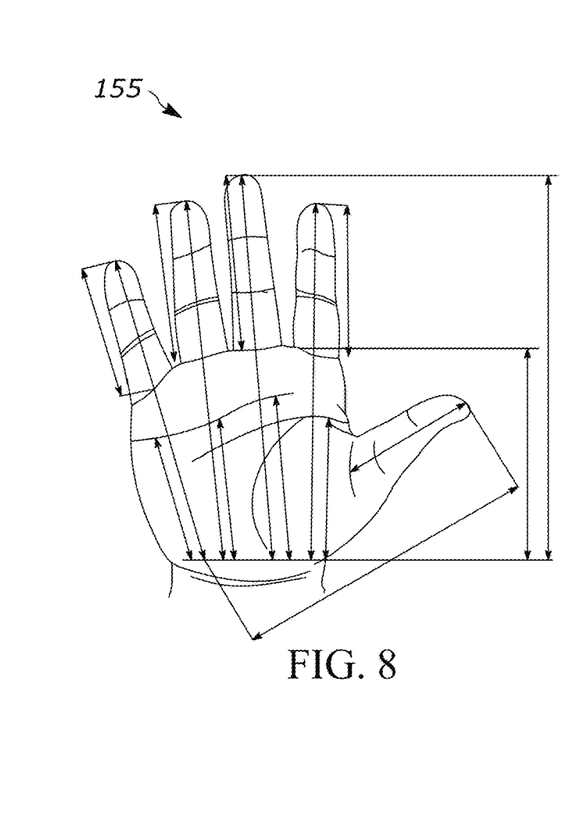
FIG. 8 illustrates examples of anthropometric measures of a hand of a user.
Figures 9, 10:
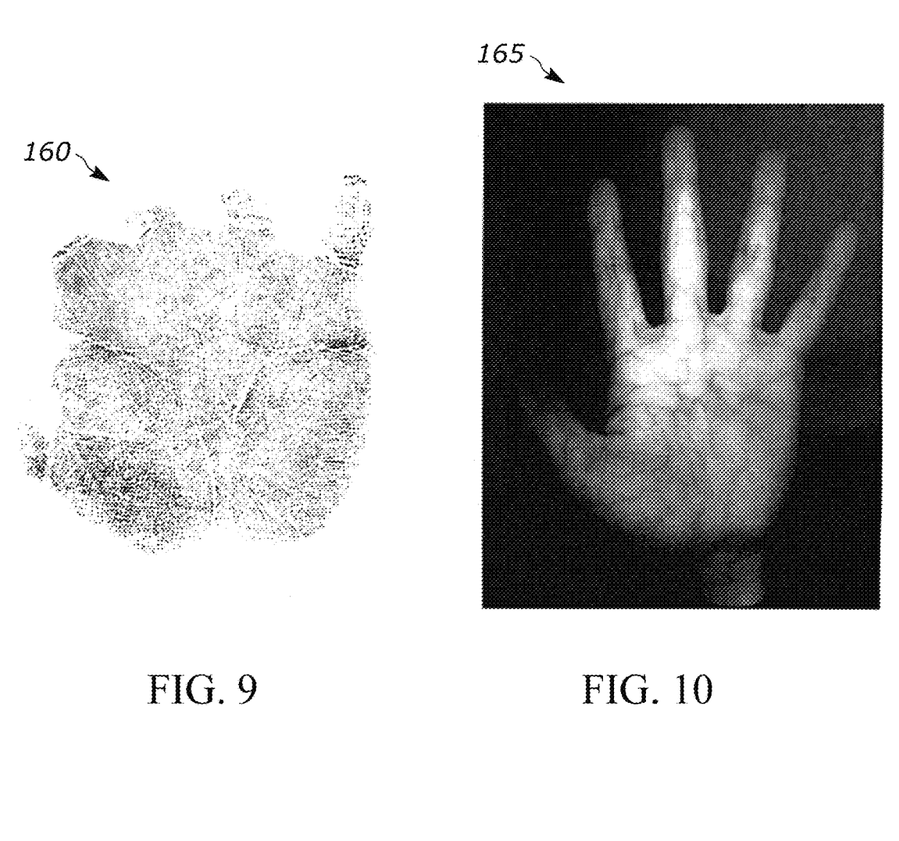
FIG. 9 illustrates example palm print elements of a hand of a user.
FIG. 10 illustrates an example palm vein arrangement of a hand of a user.

Illumination assembly 65 can include an illumination source 85 that produces visible light and controller 110 can be configured to process a captured image of the hand of the user 150 to identify the user by identifying anthropometric measurements 155 of the hand of the user 150. Examples of various anthropometric measurements 155 that can be used by controller 110 to identify the user are shown in FIG. 8 and can include, but are not limited to, a height of the hand from the base of the palm to the end of the middle finger, lengths of the fingers (as used herein, fingers include the thumb) from ends of the fingers to the base of the fingers, lengths of the fingers from the ends of the fingers to the base of the palm, distance from the base of the palm to the base of the index finger, etc. Alternatively, or in addition to identifying anthropometric measurements 155, with illumination source 85 producing visible light, controller 110 can be configured to process a captured image of the hand of the user 150 to identify the user by identifying palm print elements 160 of the hand of the user 150. An example of a palm print is shown in FIG. 9 and any appropriate well known means for identifying an individual based on their palm print elements 160 can be used by controller 110 for identifying the user based on the palm print of the hand of the user 150. Identification of palm print elements can be more accurate and secure than identification of anthropometric measurements and/or fingerprints because palm print elements have more unique elements and it is more difficult to lift or steal an entire palm print.

In another example, illumination assembly 65 can include an illumination source 80 that produces infrared light and controller 110 can be configured to process a captured image of the hand of the user 150 to identify the user by identifying palm vein arrangements 165 of the hand of the user 150 and/or to identify anthropometric measurements 155 and/or palm print elements 160 of the hand of the user 150. An example image of a hand exposed to infrared light and showing the palm vein arrangement 165 of the palm is shown in FIG. 10 and any appropriate well known means for identifying an individual based on their palm vein arrangement 165 can be used by controller 110 for identifying the user based on the palm vein arrangement of the hand of the user 150. Identification of palm vein arrangements can be more accurate and secure than identification of palm print elements and/or identification of anthropometric measurements because a palm vein arrangement cannot be left behind like a palm print, is not able to be easily imaged by a standard image capture device, and cannot be altered by scarring or other modification. In addition, controller 110 can also be configured to process and compare multiple captured images, which could allow controller 110 to identify blood movement in the hand of the user 150, for example by comparing a first image to a second image to ensure that the intensity regions of the palm veins do not match, to verify that the images containing the palm vein arrangement are images of the palm of a real person and not an image being presented to the bioptic barcode reader 10 to trick the system.

Alternatively, as shown in FIGS. 2-3, illumination assembly 65 can include illumination source 85 that produces infrared light and illumination source 80 that produces visible light and controller 110 can be configured to process a captured image of the hand of the user 150 to identify the user through one or more of: identifying palm vein arrangements 165 of the hand of the user 150; identifying palm print elements 160 of the hand of the user 150; and/or identifying anthropometric measurements 155 of the hand of the user 150. In this example, illumination source 80 and illumination source 85 can both be on at same time, in which case a single image capture can be used for anthropometric measurement, palm print element, and/or palm vein arrangement identification, or illumination of illumination source 80 and illumination source 85 can alternate, in which case the image capture with illumination source 85 (visible light) illuminated could be used for anthropometric measurement and/or palm print element identification and the image capture with illumination source 80 (infrared light) illuminated could be used for palm vein arrangement identification.

Once a user identification has been established through one or more of anthropometric measurement, palm print element, and/or palm vein arrangement identification, controller 110 can be configured to use this identification for any one or more of a variety of processes, such as: verifying an age of the user (i.e., for the purchase of alcohol, tobacco, etc.), associating the user with a loyalty account, confirming a medical identification of the user, logging into a point-of-sale system (i.e., a cashier logging in to a particular register), comparing the identity of the user to a second form of identification (i.e., a barcode on a medical identification bracelet, a photo or barcode on a driver's license, etc.), etc.

Figure 4:
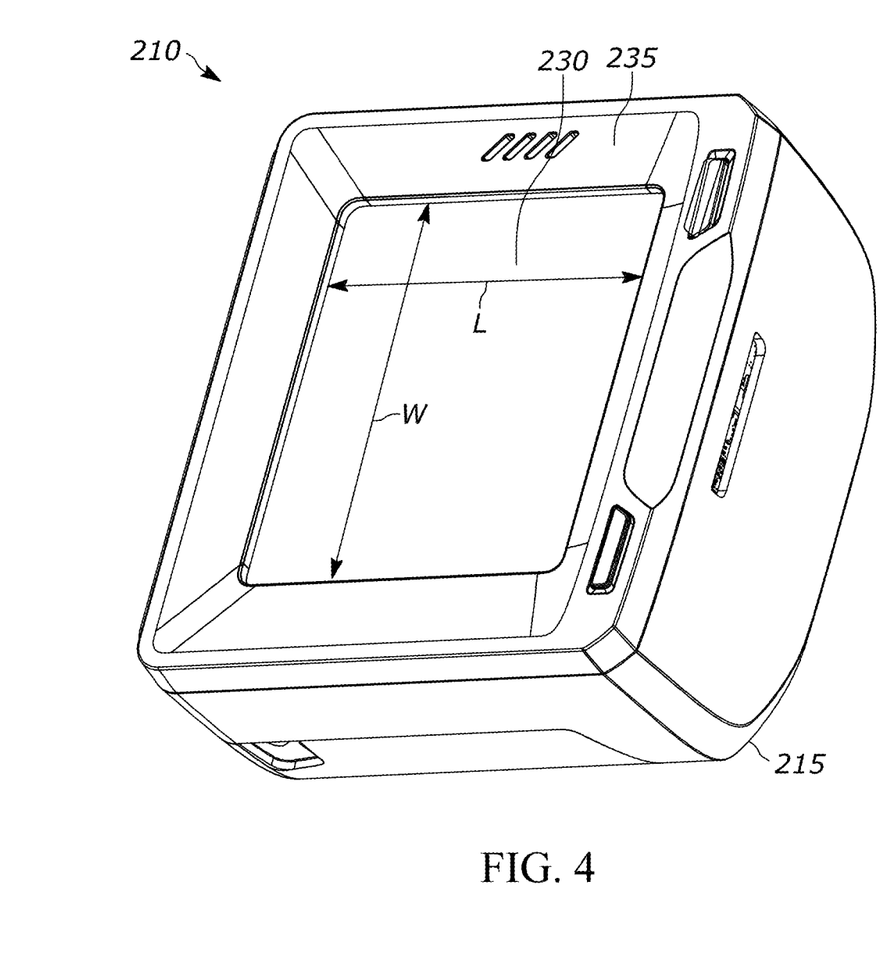
FIG. 4 illustrates a front perspective view of a first example barcode reader.
Figure 5:
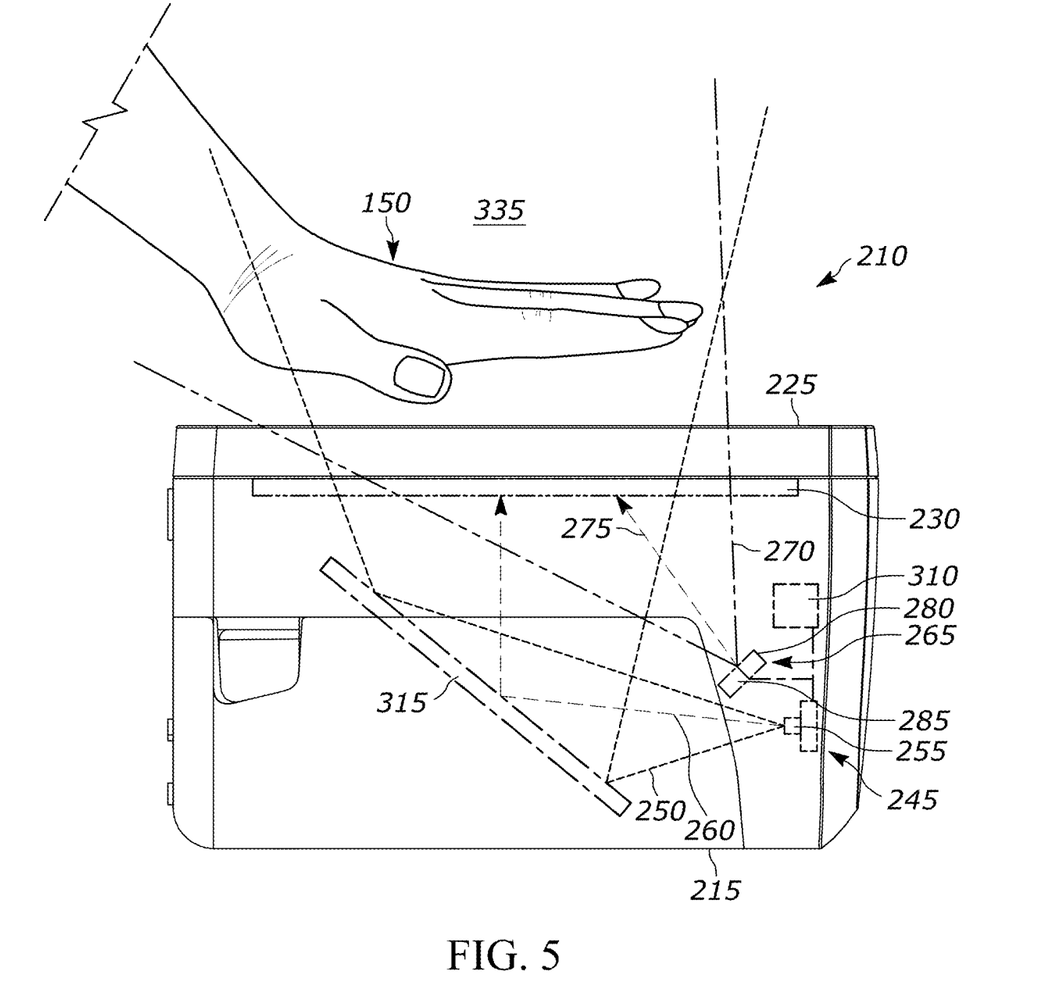
FIG. 5 illustrates a side view of the barcode reader of FIG. 4.

Referring to FIGS. 4-5, an example barcode reader 210, such as the Zebra® NG77 barcode reader, is shown. In the example shown, barcode reader 210 has a housing 215 and a window 230 positioned at a surface 225 of housing 215, which faces a product scanning region 335 (a region where an object can be scanned for sale or an image of a hand of a user 150 can be captured), to allow a set of optical components positioned within housing 215 to direct at least one field-of-view through window 230. A width W of window 230 and a length L of window 230 are each equal to or greater than 3 inches and, preferably, both width W and length L are equal to or greater than 4 inches.

As shown in FIG. 5, an example optical assembly of barcode reader 210 can generally include an imaging assembly 245 and an illumination assembly 265. Imaging assembly 245 is positioned within housing 215, is recessed within housing 215 such that an internal path length 260 between a front of imaging assembly 245 and window 230 is at least 2 inches and, preferably, is at least 4 inches, and has an imaging field-of-view (FOV) 250 that is directed toward window 230 and, preferably, fills most of window 230. As used herein, the front of imaging assembly 245 could be the front surface of an imager, the front surface of a lens, the front surface of a baffle, the front surface of a lens holder, etc., depending on the structure of the particular imaging assembly used. Imaging assembly 245 includes an imager 255, such as a CMOS digital image sensor, that can be configured to capture an image of an object, such as a product 140 being purchased or a hand of a user 150, that is positioned within product scanning region 335. Illumination assembly 265 is also positioned within housing 215, is recessed within housing 215 such that an internal path length 275 between a front of illumination assembly 265 and window 230 is at least 1.2 inches to provide sufficient illumination uniformity, and has an illumination FOV 270 that is directed toward window 230. Recessing imaging assembly 245 and illumination assembly 265 within housing 215 and spaced from window 230, rather than positioning imaging assembly 245 or illumination assembly 265 at or near window 230, provides longer internal path lengths 260, 275 and more coverage and even illumination of imaging FOV 250 by illumination FOV 270, which allows imaging assembly 245 to view objects, such as the hand of a user 150, up close to window 230 and at greater range of distances from window 230. For example, illumination FOV 270 preferably overlaps imaging FOV 250 by at least 70% within product scanning region 335 at distances from 0 inches to 3 inches above window 230 and imaging assembly 245 should be configured to have a depth of focus that includes distances from 0 inches to 3 inches above window 230.

In the particular example shown in FIGS. 4-5, the optical assembly also includes a first mirror 315, which is positioned within housing 215 and redirects imaging FOV 250 toward window 230.

A controller 310, which can include a processor and a memory, is positioned within housing 215 and is in communication with imaging assembly 245 and illumination assembly 265 via any appropriate means, such as a wired or wireless connection. Controller 310 is configured to receive a captured image from imaging assembly 245 and to process the captured image and determine if an object is present in the captured image and, if so, if the object is a product 140 for sale or a hand of user 150. Controller 310 could be configured to either recognize the presence of a hand of a user 150 and then capture an image or could provide an instruction through barcode reader 210 or through another host system to instruct the user when to place their hand in the product scanning region 335 and capture the image once controller 310 has detected the hand of the user 150 in the product scanning region 335. If controller 310 determines that the object is a product 140, controller 310 can be configured to locate and decode a barcode 145 located on product 140. If controller 310 determines that the object is a hand of a user 150, controller 310 can be configured to identify elements of the hand of the user 150, for example, for identification of the user. Alternatively, rather than controller 310 processing and identifying elements of the hand of the user 150, controller 310 could be configured to transmit the image to a processor external to barcode reader 210 to identify the elements of the hand of the user 150, which would then communicate back to controller 310 the identity of the user based on the processing by the external processor.

Illumination assembly 265 can include an illumination source 285 that produces visible light and controller 310 can be configured to process a captured image of the hand of the user 150 to identify the user by identifying anthropometric measurements 155 of the hand of the user 150, as discussed above. Alternatively, or in addition to identifying anthropometric measurements 155, with illumination source 285 producing visible light, controller 310 can be configured to process a captured image of the hand of the user 150 to identify the user by identifying palm print elements 160 of the hand of the user 150, as discussed above.

In another example, illumination assembly 265 can include an illumination source 280 that produces infrared light and controller 310 can be configured to process a captured image of the hand of the user 150 to identify the user by identifying palm vein arrangements 165 of the hand of the user 150 and/or to identify anthropometric measurements 155 and/or palm print elements 160 of the hand of the user 150, as discussed above. Controller 310 can also be configured to process and compare multiple captured images, which could allow controller 310 to identify blood movement in the hand of the user 150, for example by comparing a first image to a second image to ensure that the intensity regions of the palm veins do not match, to verify that the images containing the palm vein arrangement are images of the palm of a real person and not an image being presented to the barcode reader 210 to trick the system.

Alternatively, as shown in FIG. 5, illumination assembly 265 can include illumination source 285 that produces infrared light and illumination source 280 that produces visible light and controller 310 can be configured to process a captured image of the hand of the user 150 to identify the user through one or more of: identifying palm vein arrangements 165 of the hand of the user 150; identifying palm print elements 160 of the hand of the user 150; and/or identifying anthropometric measurements 155 of the hand of the user 150. In this example, illumination source 280 and illumination source 285 can both be on at same time, in which case a single image capture can be used for anthropometric measurement, palm print element, and/or palm vein arrangement identification, or illumination of illumination source 280 and illumination source 285 can alternate, in which case the image capture with illumination source 285 (visible light) illuminated could be used for anthropometric measurement and/or palm print element identification and the image capture with illumination source 280 (infrared light) illuminated could be used for palm vein arrangement identification.

Once a user identification has been established through one or more of anthropometric measurement, palm print element, and/or palm vein arrangement identification, controller 310 can be configured to use this identification for any one or more of a variety of processes, such as: verifying an age of the user (i.e., for the purchase of alcohol, tobacco, etc.), associating the user with a loyalty account, confirming a medical identification of the user, logging into a point-of-sale system (i.e., a cashier logging in to a particular register), comparing the identity of the user to a second form of identification (i.e., a barcode on a medical identification bracelet, a photo or barcode on a driver's license, etc.), etc.

Figure 6:
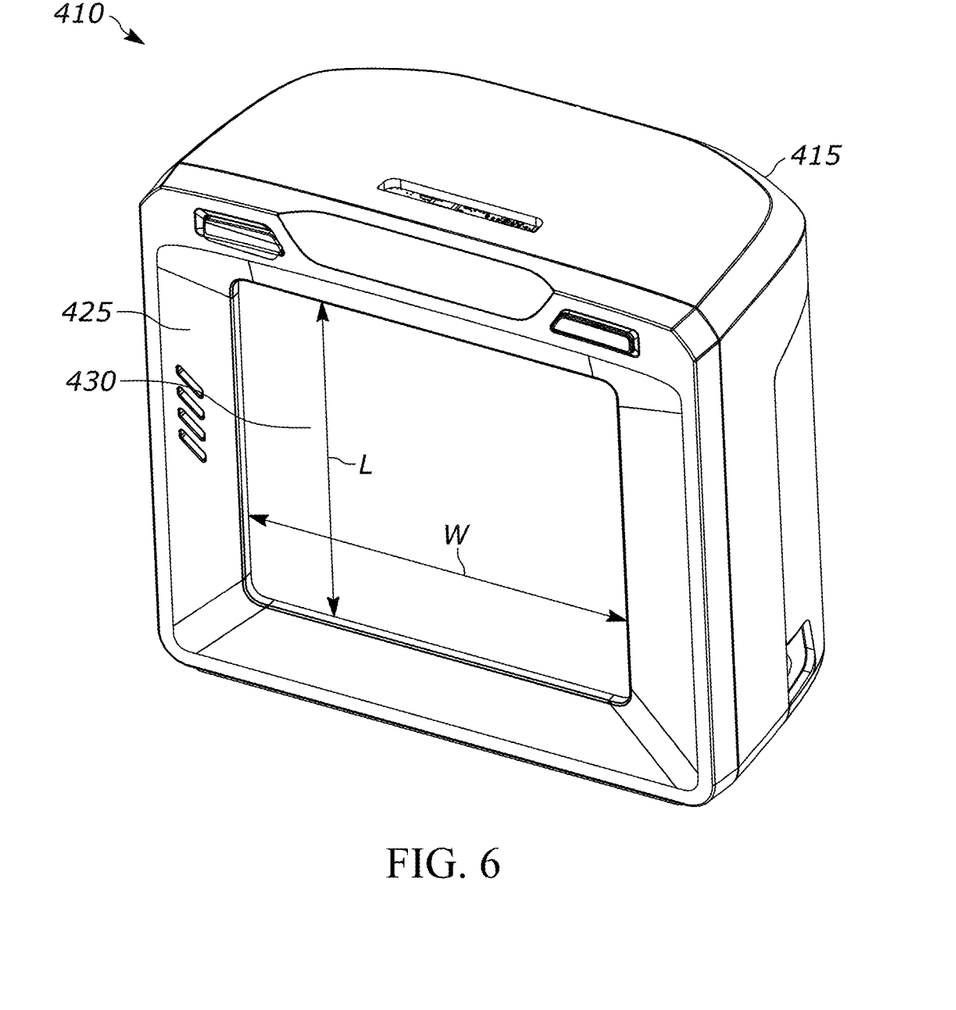
FIG. 6 illustrates a front perspective view of a second example barcode reader.
Figure 7:
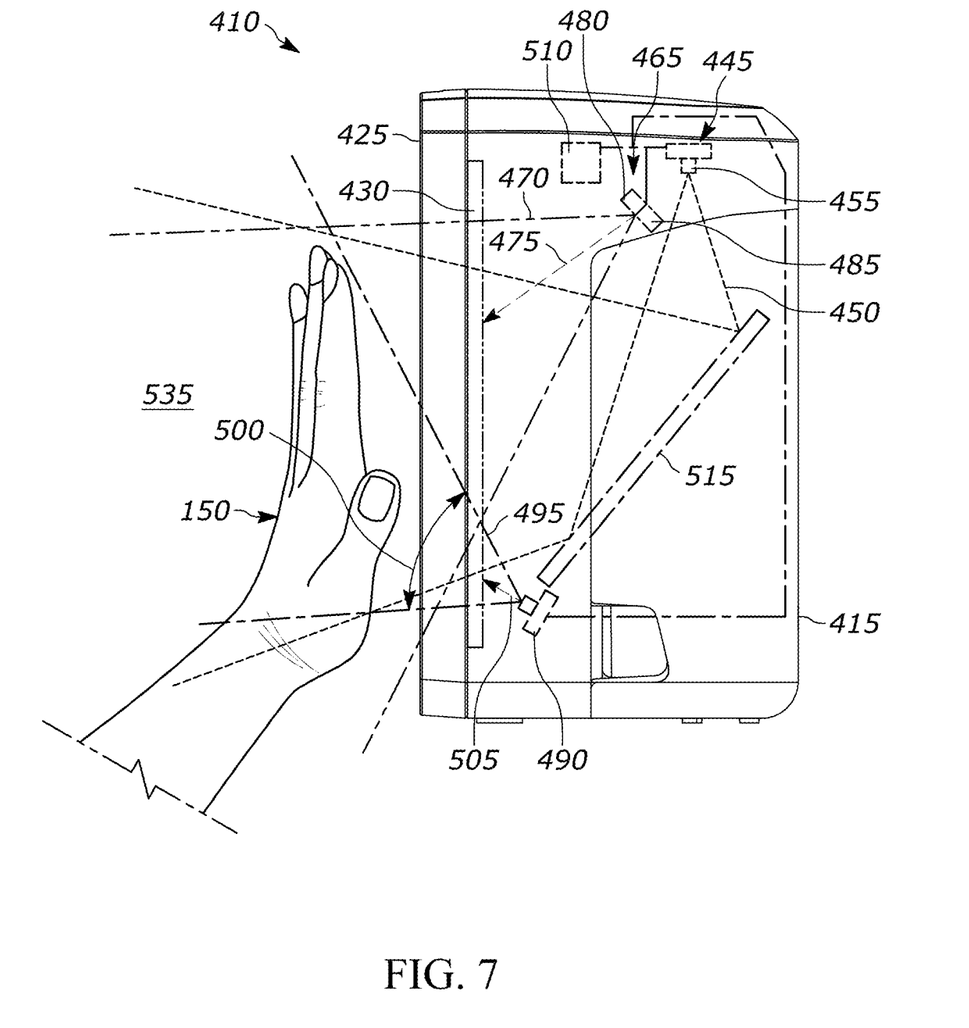
FIG. 7 illustrates a side view of the barcode reader of FIG. 6.

Referring to FIGS. 6-7, an example barcode reader 410, having a slot scanner configuration, is shown. In the example shown, barcode reader 410 has a housing 415 and a window 430 positioned at a surface 425 of housing 415, which faces a product scanning region 535 (a region where an object can be scanned for sale or an image of a hand of a user 150 can be captured), to allow a set of optical components positioned within housing 415 to direct at least one field-of-view through window 430. A width W of window 430 and a length L of window 430 are each equal to or greater than 3 inches and, preferably, both width W and length L are equal to or greater than 4 inches.

As shown in FIG. 7, an example optical assembly of barcode reader 410 can generally include an imaging assembly 445, an illumination assembly 465, and a camera 490. If camera 490 is a color camera, it could add some color data to the identification process, incorporating, for example, a user's skin tone. Imaging assembly 445 is positioned within housing 415, is recessed within housing 415, and has an imaging field-of-view (FOV) 450 that is directed toward window 430 and, preferably, fills most of window 430. As used herein, the front of imaging assembly 445 could be the front surface of an imager, the front surface of a lens, the front surface of a baffle, the front surface of a lens holder, etc., depending on the structure of the particular imaging assembly used. Imaging assembly 445 includes an imager 455, such as a CMOS digital image sensor, that can be configured to capture an image of an object, such as a product 140 being purchased or a hand of a user 150, that is positioned within product scanning region 535. Illumination assembly 465 is also positioned within housing 415, is recessed within housing 415 such that an internal path length 475 between a front of illumination assembly 465 and window 430 is at least 1.2 inches to provide sufficient illumination uniformity, and has an illumination FOV 470 that is directed toward window 430. Camera 490 is positioned within housing 415, is recessed within housing 415 such that an internal path length 505 between a front of camera 490 and window 430 is at least 0.5 inches, and has a camera FOV 495 that is directed toward window 430. Camera FOV 495 preferably has an angular width 500 that is at least 90 degrees and fills most of window 430. Recessing camera 490 and illumination assembly 465 within housing 415 and spaced from window 430, rather than positioning camera 490 or illumination assembly 465 at or near window 430, provides longer internal path lengths 475, 505 and more coverage and even illumination of camera FOV 495 by illumination FOV 470, which allows camera 490 to view objects, such as the hand of a user 150, up close to window 430 and at greater range of distances from window 430. For example, illumination FOV 470 preferably overlaps camera FOV 495 by at least 70% within product scanning region 535 at distances from 0 inches to 3 inches above window 430.

In the particular example shown in FIGS. 6-7, the optical assembly also includes a first mirror 515, which is positioned within housing 415 and redirects imaging FOV 450 toward window 430.

A controller 510, which can include a processor and a memory, is positioned within housing 415 and is in communication with imaging assembly 445, illumination assembly 465, and camera 490 via any appropriate means, such as a wired or wireless connection. Controller 510 is configured to receive a first captured image from imaging assembly 445, receive a second captured image from camera 490, process the first captured image to decode a barcode 145 if the object in the product scanning region 535 is a product 140 for sale, and process the second captured image from camera 490 to identify elements of a hand of a user 150 if the object in the product scanning region 535 is a hand of a user 150. Controller 510 could be configured to either recognize the presence of a hand of a user 150 and then capture the second captured image or could provide an instruction through barcode reader 410 or through another host system to instruct the user when to place their hand in the product scanning region 535 and capture the second captured image once controller 510 has detected the hand of the user 150 in the product scanning region 535. Alternatively, rather than controller 510 processing and identifying elements of the hand of the user 150, controller 510 could be configured to transmit the second captured image to a processor external to barcode reader 410 to identify the elements of the hand of the user 150, which would then communicate back to controller 510 the identity of the user based on the processing by the external processor.

Illumination assembly 465 can include an illumination source 485 that produces visible light and controller 510 can be configured to process a second captured image of the hand of the user 150 to identify the user by identifying anthropometric measurements 155 of the hand of the user 150, as discussed above. Alternatively, or in addition to identifying anthropometric measurements 155, with illumination source 485 producing visible light, controller 510 can be configured to process a second captured image of the hand of the user 150 to identify the user by identifying palm print elements 160 of the hand of the user 150, as discussed above.

In another example, illumination assembly 465 can include an illumination source 480 that produces infrared light and controller 510 can be configured to process a second captured image of the hand of the user 150 to identify the user by identifying palm vein arrangements 165 of the hand of the user 150 and/or to identify anthropometric measurements 155 and/or palm print elements 160 of the hand of the user 150, as discussed above. Controller 510 can also be configured to process and compare multiple second captured images, which could allow controller 510 to identify blood movement in the hand of the user 150, for example by comparing a first image to a second image to ensure that the intensity regions of the palm veins do not match, to verify that the images containing the palm vein arrangement are images of the palm of a real person and not an image being presented to the barcode reader 410 to trick the system.

Alternatively, as shown in FIG. 7, illumination assembly 465 can include illumination source 485 that produces infrared light and illumination source 480 that produces visible light and controller 510 can be configured to process a captured image of the hand of the user 150 to identify the user through one or more of: identifying palm vein arrangements 165 of the hand of the user 150; identifying palm print elements 160 of the hand of the user 150; and/or identifying anthropometric measurements 155 of the hand of the user 150. In this example, illumination source 480 and illumination source 485 can both be on at same time, in which case a single second image capture can be used for anthropometric measurement, palm print element, and/or palm vein arrangement identification, or illumination of illumination source 480 and illumination source 485 can alternate, in which case the image capture with illumination source 485 (visible light) illuminated could be used for anthropometric measurement and/or palm print element identification and the image capture with illumination source 480 (infrared light) illuminated could be used for palm vein arrangement identification.

Once a user identification has been established through one or more of anthropometric measurement, palm print element, and/or palm vein arrangement identification, controller 510 can be configured to use this identification for any one or more of a variety of processes, such as: verifying an age of the user (i.e., for the purchase of alcohol, tobacco, etc.), associating the user with a loyalty account, confirming a medical identification of the user, logging into a point-of-sale system (i.e., a cashier logging in to a particular register), comparing the identity of the user to a second form of identification (i.e., a barcode on a medical identification bracelet, a photo or barcode on a driver's license, etc.), etc.

In addition to being used in a barcode scanner with a single window, such as barcode reader 410 discussed above, an optical assembly including an imaging assembly, an illumination assembly, and a camera can also be used in a bioptic barcode reader, such as bioptic barcode reader 10 discussed above. In this embodiment, window 430 would correspond to horizontal window 30, camera 490 would be positioned in housing 15 and recessed within housing 15, and camera FOV 495 would be directed through horizontal window 30. Controller 110 could then be configured to receive and process a first captured image from imaging assembly 45 and a second captured image from camera 490, as discussed above.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A bioptic barcode reader, comprising:
a housing having a lower housing portion with an upper surface facing a product scanning region and an upper housing portion extending above the lower housing portion;
a generally horizontal window positioned at the upper surface of the lower housing portion;
a generally upright window positioned in the upper housing portion;
an imaging assembly recessed within the lower housing portion and having an imaging field-of-view (FOV) that is directed toward the horizontal window, the imaging assembly including an imager configured to capture an image of an object positioned within the product scanning region;
an illumination assembly recessed within the lower housing portion and having an illumination FOV that is directed toward the horizontal window, the illumination FOV overlapping the imaging FOV by at least 70% within the product scanning region from zero inches to 3 inches above the horizontal window; and
a controller in communication with the imaging assembly and the illumination assembly, the controller configured to receive a captured image from the imaging assembly and to process the captured image to: determine if the object is a product for sale or a hand of a user; decode a barcode located on the object if the object is a product for sale; and identify elements of the hand of the user for identification of the user if the object is the hand of the user.

2. The bioptic barcode reader of claim 1, wherein the imaging assembly is recessed with the lower housing portion such that an internal path length between a front of the imaging assembly and the horizontal window is at least 2 inches.

3. The bioptic barcode reader of claim 1, where the illumination assembly is recessed within the lower housing portion such that an internal path length between a front of the illumination assembly and the horizontal window is at least 1.2 inches.

4. The bioptic barcode reader of claim 1, comprising a first mirror positioned within the lower housing portion, wherein the imaging FOV is redirected by the first mirror towards the horizontal window.

5. The bioptic barcode reader of claim 4, wherein the illumination FOV is redirected by the first mirror towards the horizontal window.

6. The bioptic barcode reader of claim 1, wherein: the illumination assembly includes an illumination source that produces visible light; and the controller is configured to process the captured image to identify the user by identifying anthropometric measurements of the hand of the user.

7. The bioptic barcode reader of claim 1, wherein: the illumination assembly includes an illumination source that produces visible light; and the controller is configured to process the captured image to identify the user by identifying palm print elements of the hand of the user.

8. The bioptic barcode reader of claim 1, wherein: the illumination assembly includes an illumination source that produces infrared light; and the controller is configured to process the captured image to identify the user by identifying palm vein arrangements of the hand of the user.

9. The bioptic barcode reader of claim 1, wherein: the illumination assembly includes a first illumination source that produces infrared light and a second illumination source that produces visible light; and the controller is configured to process the captured image to identify the user through one or more of: identifying palm vein arrangements of the hand of the user, identifying palm print elements of the hand of the user, and/or identifying anthropometric measurements of the hand of the user.

10. The bioptic barcode reader of claim 1, wherein the controller is configured to use an identity of the user for one or more of: verifying an age of the user, associating the user with a loyalty account, confirming a medical identification of the user, logging into a point-of-sale system, and/or comparing the identity of the user to a second form of identification.

11. A barcode reader, comprising:
a housing having a surface facing a product scanning region;
a window positioned at the surface of the housing;
an imaging assembly recessed within the housing and having an imaging field-of-view (FOV) that is directed toward the window, the imaging assembly including an imager configured to capture an image of an object positioned within the product scanning region;
an illumination assembly recessed within the housing and having an illumination FOV that is directed toward the window, the illumination FOV overlapping the imaging FOV by at least 70% within the product scanning region from zero inches to 3 inches from the window; and
a controller in communication with the imaging assembly and the illumination assembly, the controller configured to receive a captured image from the imaging assembly and to process the captured image to: determine if the object is a product for sale or a hand of a user; decode a barcode located on the object if the object is a product for sale; and identify elements of the hand of the user for identification of the user if the object is the hand of the user.

12. The barcode reader of claim 11, wherein the imaging assembly is recessed with the housing such that an internal path length between a front of the imaging assembly and the window is at least 2 inches.

13. The barcode reader of claim 11, where the illumination assembly is recessed within the housing such that an internal path length between a front of the illumination assembly and the window is at least 1.2 inches.

14. The barcode reader of claim 11, comprising a first mirror positioned within the housing, wherein the imaging FOV is redirected by the first mirror towards the window.

15. The barcode reader of claim 11, wherein: the illumination assembly includes an illumination source that produces visible light; and the controller is configured to process the captured image to identify the user by identifying anthropometric measurements of the hand of the user.

16. The barcode reader of claim 11, wherein: the illumination assembly includes an illumination source that produces visible light; and the controller is configured to process the captured image to identify the user by identifying palm print elements of the hand of the user.

17. The barcode reader of claim 11, wherein: the illumination assembly includes an illumination source that produces infrared light; and the controller is configured to process the captured image to identify the user by identifying palm vein arrangements of the hand of the user.

18. The barcode reader of claim 11, wherein: the illumination assembly includes a first illumination source that produces infrared light and a second illumination source that produces visible light; and the controller is configured to process the captured image to identify the user through one or more of: identifying palm vein arrangements of the hand of the user, identifying palm print elements of the hand of the user, and/or identifying anthropometric measurements of the hand of the user.

19. The barcode reader of claim 11, wherein the controller is configured to use an identity of the user for one or more of: verifying an age of the user, associating the user with a loyalty account, confirming a medical identification of the user, logging into a point-of-sale system, and/or comparing the identity of the user to a second form of identification.

20. A barcode reader, comprising:
- a housing having a surface facing a product scanning region;
- a window positioned at the surface of the housing;
- an imaging assembly recessed within the housing and having an imaging field-of-view (FOV) that is directed toward the window, the imaging assembly including an imager configured to capture an image of an object positioned within the product scanning region;
- an illumination assembly recessed within the housing and having an illumination FOV that is directed toward the window;
- a camera recessed within the housing and having a camera FOV that is directed toward the window, the illumination FOV overlapping the camera FOV by at least 70% within the product scanning region from zero inches to 3 inches from the window; and
- a controller in communication with the imaging assembly, the illumination assembly, and the camera, the controller configured to receive a first captured image from the imaging assembly, receive a second captured image from the camera, process the first captured image to decode a barcode if the object is a product for sale, and process the second captured image to identify elements of a hand of a user if the object is the hand of the user.

21. The barcode reader of claim 20, wherein the camera is recessed with the housing such that an internal path length between a front of the camera and the window is at least 0.5 inches and an angular width of the camera FOV is at least 90 degrees.

22. The barcode reader of claim 20, where the illumination assembly is recessed within the housing such that an internal path length between a front of the illumination assembly and the window is at least 1.2 inches.

23. The barcode reader of claim 20, comprising a first mirror positioned within the housing, wherein the imaging FOV is redirected by the first mirror towards the window.

24. The barcode reader of claim 20, wherein: the illumination assembly includes an illumination source that produces visible light; and the controller is configured to process the second captured image to identify the user by identifying anthropometric measurements of the hand of the user.

25. The barcode reader of claim 20, wherein: the illumination assembly includes an illumination source that produces visible light; and the controller is configured to process the second captured image to identify the user by identifying palm print elements of the hand of the user.

26. The barcode reader of claim 20, wherein: the illumination assembly includes an illumination source that produces infrared light; and the controller is configured to process the second captured image to identify the user by identifying palm vein arrangements of the hand of the user.

27. The barcode reader of claim 20, wherein: the illumination assembly includes a first illumination source that produces infrared light and a second illumination source that produces visible light; and the controller is configured to process the second captured image to identify the user through one or more of: identifying palm vein arrangements of the hand of the user, identifying palm print elements of the hand of the user, and/or identifying anthropometric measurements of the hand of the user.

28. The barcode reader of claim 20, wherein the controller is configured to use an identity of the user for one or more of: verifying an age of the user, associating the user with a loyalty account, confirming a medical identification of the user, logging into a point-of-sale system, and/or comparing the identity of the user to a second form of identification.

29. The barcode reader of claim 20, wherein:
- the housing includes a lower housing portion with the surface and an upper housing portion extending above the lower housing portion; and
- the window is a generally horizontal window positioned at the surface of the lower housing portion and the barcode reader includes a generally upright window positioned in the upper housing portion.

* * * * *